(12) United States Patent
Tam et al.

(10) Patent No.: US 9,172,916 B2
(45) Date of Patent: Oct. 27, 2015

(54) WEB MONITORING SYSTEM

(75) Inventors: Eddy C. Tam, Mint Hill, NC (US); John G. Larkin, Charlotte, NC (US); Brian J. Mock, Raleigh, NC (US)

(73) Assignee: Event Capture Systems, Inc., Charlotte, NC (US)

( * ) Notice: Subject to any disclaimer, the term of this patent is extended or adjusted under 35 U.S.C. 154(b) by 957 days.

(21) Appl. No.: 13/323,543

(22) Filed: Dec. 12, 2011

(65) Prior Publication Data

US 2012/0147177 A1 Jun. 14, 2012

Related U.S. Application Data

(60) Provisional application No. 61/422,172, filed on Dec. 12, 2010.

(51) Int. Cl.
*H04N 7/18* (2006.01)
*G06T 7/00* (2006.01)

(52) U.S. Cl.
CPC *H04N 7/18* (2013.01); *G06T 7/001* (2013.01); *G06T 2207/30124* (2013.01)

(58) Field of Classification Search
CPC . H04N 7/18; G06T 7/001; G06T 2207/30124
USPC ...................................... 348/125; 250/559.46
See application file for complete search history.

(56) References Cited

U.S. PATENT DOCUMENTS

| | | | |
|---|---|---|---|
| 5,717,456 A | 2/1998 | Rudt et al. | |
| 5,821,990 A | 10/1998 | Rudt et al. | |
| 6,211,905 B1 | 4/2001 | Rudt et al. | |
| 7,522,834 B2 | 4/2009 | Heaven et al. | |
| 7,773,226 B2 | 8/2010 | Hofeldt et al. | |
| 2002/0109112 A1* | 8/2002 | Guha et al. | 250/559.46 |
| 2004/0052501 A1 | 3/2004 | Tam | |
| 2010/0231704 A1 | 9/2010 | Brenneman et al. | |
| 2011/0317907 A1 | 12/2011 | Petry et al. | |

OTHER PUBLICATIONS

Search string of USPTO records for USPTO classes 348/86 or 348/88 or 348/125 and keywords "velocity" and "paper" completed on Dec. 14, 2011.
Search string of USPTO records for USPTO classes 348/86 or 348/125 and keywords "speed" and "paper" andnot "velocity" completed on Dec. 14, 2011.

* cited by examiner

*Primary Examiner* — Allen Wong

(74) *Attorney, Agent, or Firm* — NK Patent Law, PLLC

(57) ABSTRACT

A method for identifying defects in a web of material is provided. The method may include monitoring one or more characteristics of a web translating along a travel path. The one or more characteristics may include one of position, speed of travel, and direction of travel. The method may include identifying a candidate for a defect by detecting one or more deviations in the web at a first time frame. The method may include monitoring one or more characteristics of the candidate for a defect at one or more subsequent time frames. The method may include determining whether the candidate is a defect by comparing the one or more characteristics of the candidate at one or more subsequent time frames to the one or more characteristics of the web. A related system is also provided.

13 Claims, 8 Drawing Sheets

WEB MONITORING SYSTEM

CROSS-REFERENCE TO RELATED APPLICATIONS

This application claims priority to U.S. Provisional Patent Application No. 61/422,172 filed on Dec. 12, 2010, the entire contents of which are hereby incorporated by reference.

TECHNICAL FIELD

The present invention is directed towards a web monitoring system, and more particularly, to a web monitoring system configured to detect a defect in a web.

BACKGROUND

This invention relates generally to a web monitoring system and associated methods. Web monitoring systems and methods are widely used for capturing video images of random events in a manufacturing environment. Examples of manufacturing environments include a manufacturing facility that may be producing a web such as paper or cardboard. These systems typically operate under video monitoring during which video images of the environment are recorded. Specifically, the video monitoring is configured for detecting a triggering event within the environment. A triggering event may be the capturing of a defect such as a tear or puncture in the web. Upon the occurrence of the event, the video image of the event is thus recorded, or "captured" for later viewing by the system operator. Optionally, at the occurrence of the event, the manufacturing line may be shut down so that the malfunction causing the triggering event may be located and any issues associated therewith may be resolved. After the event is captured, the video image of the event may be replayed so that the event can be analyzed.

Prior systems suffered from an over-inclusion of reporting triggering events. For systems that are user monitored, a user was required to monitor the system at all times and determine, on a case by case basis, whether each triggering event was a defect in the web. False positives may have routinely been detected by prior art systems. For example, a water droplet passing between a monitoring camera and web may be a triggering event captured by the web monitoring system, but is not a defect. Accordingly, a need exists for a system and method that is able to more precisely identify triggering events as defects in the web.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein is a method for identify defects in a web of material. The method includes monitoring a web having one or more characteristics, identifying a candidate for a defect, and determining whether the candidate is a defect by comparing one or more characteristics of the candidate to the one or more characteristics of the web.

According to one or more embodiments disclosed herein, the one or more characteristics of the web is one of position, speed, direction of travel, and time.

According to one or more embodiments disclosed herein, the one or more characteristics of the web is one of opaqueness, and identifying a candidate for a defect includes identifying a deviation in opaqueness of a portion of the web.

According to one or more embodiments disclosed herein, identifying a candidate for a defect includes identifying a deviation in the one or more characteristics of the web at a first time.

According to one or more embodiments disclosed herein, determining whether the candidate is a defect includes comparing one or more characteristics of the candidate at a second time to the one or more characteristics of the web at a first time.

According to one or more embodiments disclosed herein, determining whether the candidate is a defect includes comparing one or more characteristics of a leading edge of the candidate at a second time to the one or more characteristics of the web at a first time.

According to one or more embodiments disclosed herein, a method for identifying defects in a web of material is provided. The method includes monitoring one or more characteristics of a web translating along a travel path, the one or more characteristics including one of position, speed of travel, and direction of travel, identifying a candidate for a defect by detecting one or more deviations in the web at a first time frame, and monitoring one or more characteristics of the candidate for a defect at one or more subsequent time frames. The one or more characteristics include one of position, speed of travel, and direction of travel. The method includes determining whether the candidate is a defect by comparing the one or more characteristics of the candidate at one or more subsequent time frames to the one or more characteristics of the web.

According to one or more embodiments disclosed herein, the method includes assigning a vector corresponding to the web translating along a travel path based on the one or more characteristics and assigning a vector corresponding to the candidate for a defect based on the one or more characteristics. The method may include comparing the vector corresponding to the candidate for a defect with the vector corresponding to the web translating along a travel path.

According to one or more embodiments disclosed herein, monitoring one or more characteristics of the candidate for a defect at one or more subsequent time frames includes monitoring one or more characteristics of a leading edge of the candidate for a defect and assigning a vector corresponding to the defect comprises assigning a vector based on the one or more characteristics of a leading edge of the candidate for a defect.

According to one or more embodiments disclosed herein, monitoring one or more characteristics of the candidate for a defect at one or more subsequent time frames includes monitoring one or more characteristics of a portion of the candidate for a defect and assigning a vector corresponding to the defect comprises assigning a vector based on the one or more characteristics of a portion of the candidate for a defect.

According to one or more embodiments disclosed herein, a system for identifying defects in a web of material is provided. The system includes at least one camera for monitoring a web having one or more characteristics, at least one detector configured for identifying a candidate for a defect, and a control module for determining whether the candidate is a defect by comparing one or more characteristics of the candidate to the one or more characteristics of the web.

According to one or more embodiments disclosed herein, the at least one detector is configured for identifying a candidate for a defect by identifying a deviation in opaqueness of a portion of the web.

According to one or more embodiments disclosed herein, the at least one detector is configured for identifying a candidate for a defect by identifying a deviation in the one or more characteristics of the web at a first time.

According to one or more embodiments disclosed herein, the control module is configured for determining whether the candidate is a defect by comparing one or more characteristics of the candidate at a second time to the one or more characteristics of the web at a first time.

According to one or more embodiments disclosed herein, the control module is configured for determining whether the candidate is a defect by comparing one or more characteristics of a leading edge of the candidate at a second time to the one or more characteristics of the web at a first time.

According to one or more embodiments disclosed herein, the system includes a display for displaying images received from the at least one camera.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings:

FIG. 2B illustrates one or more systems for monitoring a web traveling along a defined path "P" in a second time frame;

DETAILED DESCRIPTION

The presently disclosed subject matter is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Conventional web monitoring systems were configured for detecting a deviation in the web's monitored characteristics, however, those conventional systems were not optimally configured for further determining whether the deviation in the web's monitored characteristics was actually a defect that may require shut down, inspection, and/or repair of the production system. Accordingly, once a deviation was detected by conventional web monitoring systems, the system operator must either shut down the production line and perform an inspection of the web, or continue running the production line and risk further damage thereto. The one or more web monitoring systems disclosed herein are configured for determining whether those monitored deviations are a defect in the web that may require further investigation.

Figure 1:
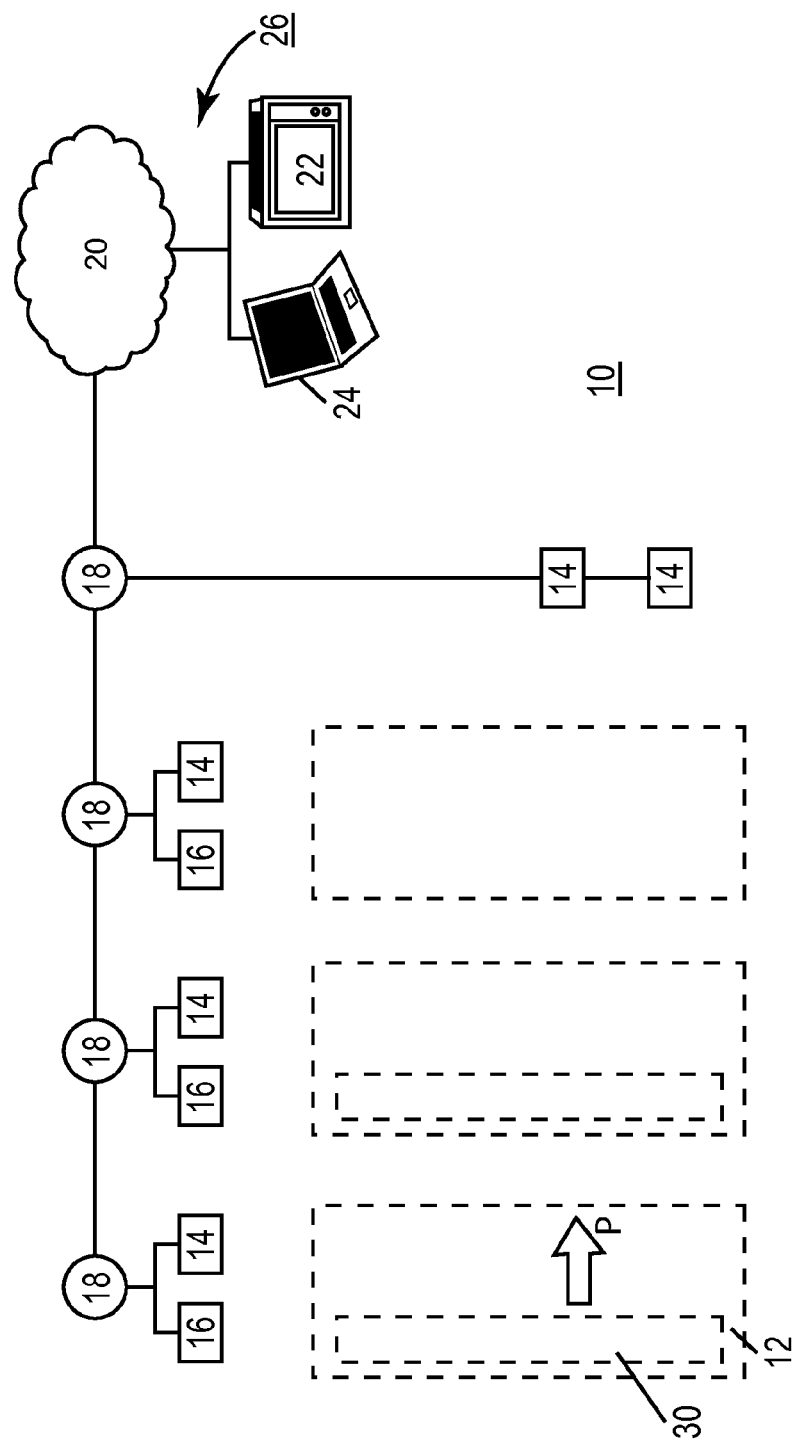
FIG. 1 illustrates one or more systems for monitoring a web traveling along a defined path "P"

FIG. 1 illustrates a schematic diagram of a web monitoring system 10 according to one or more embodiments of the present invention. The system 10 includes a web 12 traveling along a path "P" that may be defined along a web production line. For example, a web production line for making various paper products may be suitably depicted as system 10. The web 12 may have a wet end section, press end section, dryer section, additional web sections, and reel sections. These sections may be present in some industrial processes such as that which may be found in a paper production facility, but the systems and methods disclosed herein are equally applicable to other industrial settings.

The system 10 may also include at least one camera 14 for monitoring the web 12. The camera 14 may be a line scan camera that compiles lines of pixels to produce a two dimensional image, or may be an area scan camera capable of capturing a larger field of view. Each camera 14 may be positioned proximal a detector 16, which in one or more embodiments, may include a light, such as an LED light. Each detector 16 is positioned beside each camera 14 to detect defects in the web 12. Each camera 14 and detector 16 may be coupled to a junction box 18 that is in communication with a central processor or server 20. Each junction box is provided for coupling electronic devices such as camera 14 or detector 16 thereto. In one or more embodiments, each camera 14 and each detector 16 may be hard-wired to the server 20, while in other embodiments, each component may be in wireless communication with the server 20. Still in one or more embodiments, each camera 14 may have internalized electronic and programming components such that the cameras 14 act as stand-alone systems that do not require a centralized server 20.

The server 20 may be any suitable electronic server configured for receiving information from each respective camera 14. The server 20 may also be in communication with a display screen 22 for displaying information received therefrom. A user interface 24 may be in communication with the server 20 for reviewing recordings provided by the camera 14 and collectively forms a control system 26.

Each camera 14 and light 16 are positioned proximal a region of interest 30 of the web 12. A region of interest 30 may be any region along the manufacturing line in which a defect of the web 12 may likely be found. For example, a region of interest 30 is defined about the press section of the manufacturing line where defects are likely to occur because of the contact between the press and the web 12.

Each camera 14 may be configured for monitoring the web 12 and recording characteristics thereof and outputting those characteristics to the control system 26. The control system 26 may compare the recorded characteristics of the web 12 with various predetermined characteristics thereof. In some instances, these variations, which are also referred to as candidates for a defect, in the monitored characteristics of the web 12 may be a defect, while, in other instances, these variations in the monitored characteristics of the web 12 may not be a defect, and may instead be a variation in predetermined characteristics that may be expected or within acceptable ranges. In other instances, cameras 14 may capture a foreign object that is carried on the web 12, but does not represent a defect.

The monitored characteristics of the web 12 may include density, opacity, speed, weight, and/or fiber count. In one or more embodiments, the cameras 14 measure the gray-scale intensity of the web 12 and the control system 26 is configured for detecting a defect in the web 12 when the cameras 14 measure a variation in the expected gray-scale intensity of the web 12.

Conventional web monitoring systems are not configured for determining whether a measured variation in the expected gray-scale intensity of the web was a defect or a false defect detected by the camera. For example, a camera and light could be positioned at a cut line for the web. This cut line may be made by a trim squirt cut in which a high pressure stream of water is directed at the web. In this example, a false defect such as a water droplet could be detected by the camera at the trim squirt cut line. The water droplet would register a variation in the gray-scale intensity of the web within the respective region of interest.

The systems and methods of the presently disclosed invention are configured for determining whether the variation in the measured characteristics of the web 12 is a true defect or a false defect. As used herein, a variation in the measured characteristics of the web 12 that has not yet determined to be a true defect or a false defect will be termed a candidate for a defect 32.

Figure 2A:
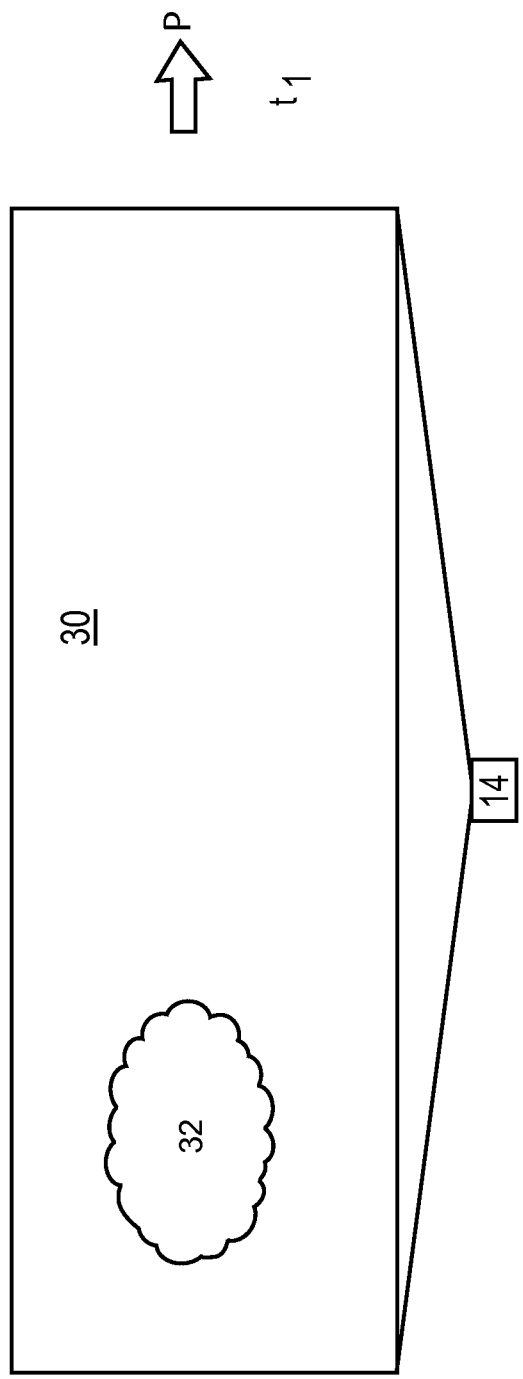
FIG. 2A illustrates one or more systems for monitoring a web traveling along a defined path "P" in a first time frame.

FIG. 2A illustrates a camera 14 recording a field of interest 30 of the web at a first time frame. The camera 14 measures a characteristic of the field of interest 30 and the control system 26 is configured for detecting a deviation in the measured characteristics of the field of interest 30 from predetermined expected characteristics of the web 12. As illustrated, a candidate 32 is detected by the control system 26 and may be detected according to any of the detection processes known in the art, or in one or more embodiments, may be detected due to a variance in the gray-scale intensity of the monitored characteristics of the web 12. Alternatively, use of infrared scanning or similar technology may be employed.

FIG. 2B illustrates a time sequential view of the region of interest 30 depicted in FIG. 2A in which the web 12 is recorded at a second time frame "t2" and has moved a defined distance as compared to the web 12 in the first time frame "t1" illustrated in FIG. 2A. The candidate 32 is shown in a cross-hatched pattern in FIG. 2B to denote the position in the first time frame. The control system 26 then compares the distance traveled by the candidate 32 with the distance traveled by the web 12. If the distance traveled by the candidate 32 is equal to or generally equal to the distance traveled by the web 12 then it is likely that the candidate 24 is a defect 34. For example, in one possible manufacturing environment, the web 12 should move about two and one half inches between the first time frame "t1" and the second time frame "t2." If the candidate 32 also moves two and one half inches between time frame "t1" and time frame "t2," it is likely that the candidate 32 is a defect. This is because the defect will typically have the same speed associated therewith as it travels along path "P," whereas a foreign object carried by the web 12 may change positions and velocities on the web 12 as it travels along path "P." Additionally, candidates for a defect 24 occurring at one position along path "P," yet not occurring along downstream positions therefrom are not likely to be defects. The system 10 may then optionally display some indicia representative of a defect on the display screen 22.

Figure 3:
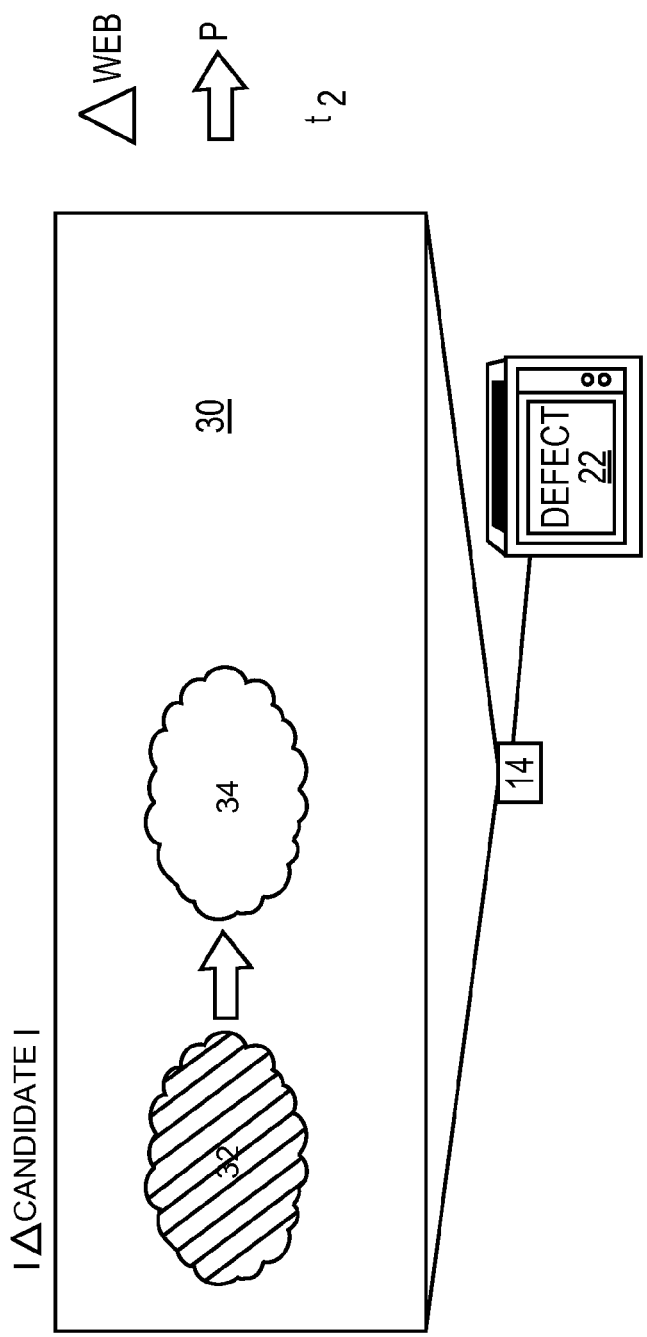
FIG. 3A illustrates one or more systems for monitoring a web traveling along a defined path "P" in a first time frame.
FIG. 3B illustrates one or more systems for monitoring a web traveling along a defined path "P" in a second time frame.
Figure 3A:
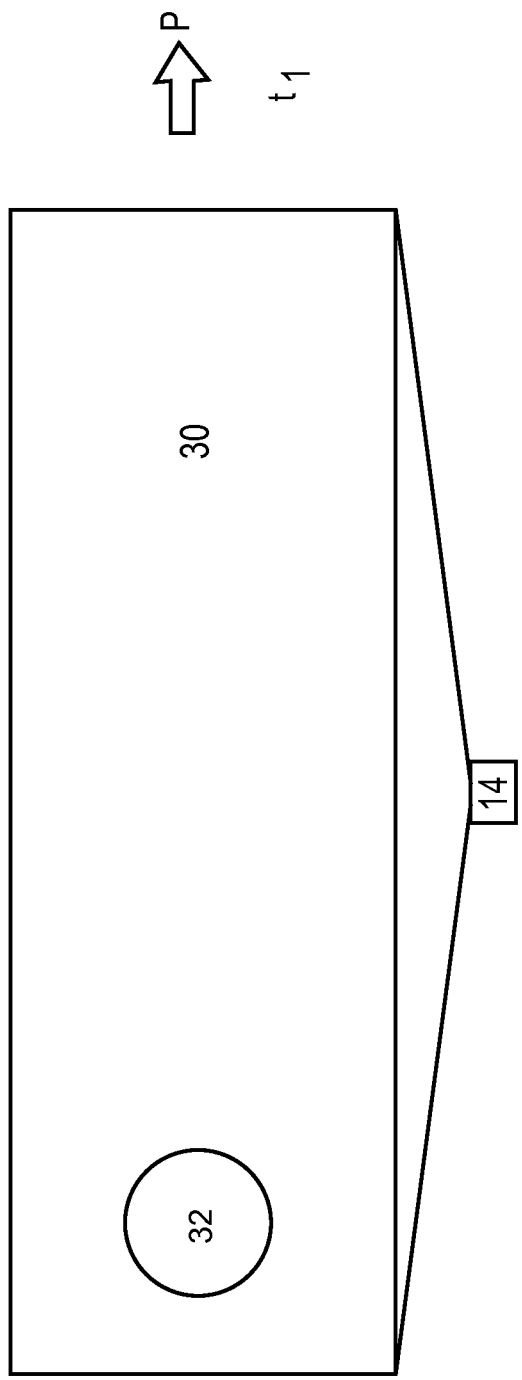
Figure 3B:
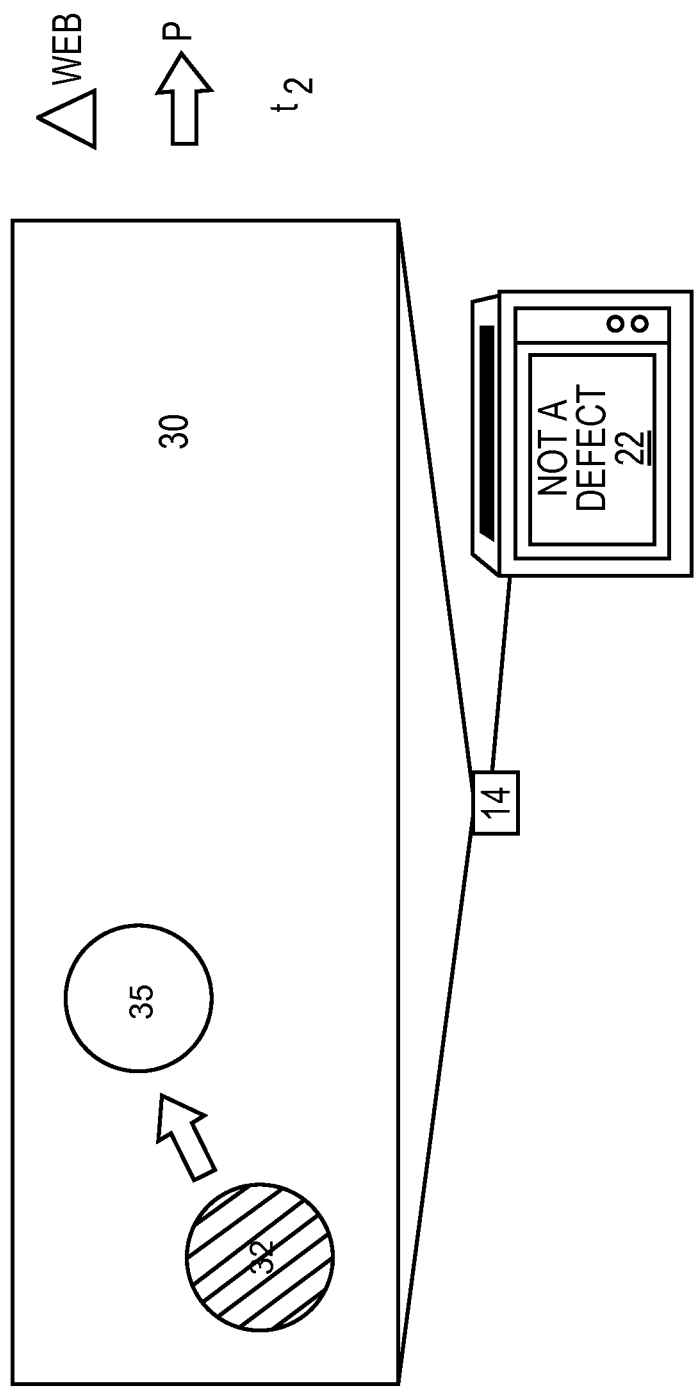

As used herein, the distance traveled by the candidate 32 and the distance traveled by the web 12 may also be expressed as directional components such that the system 10 determines that a candidate 32 is a defect when the candidate travels along web 12 in the same or generally the same direction as the web travel "P." For example, as illustrated in FIG. 3A and FIG. 3B, the web 12 travels in a generally right-handed direction, whereas the candidate 32, shown in cross-hatched pattern in FIG. 3B to denote the position in the first time frame, has traveled in a slightly angled direction between the first time frame "t1" and the second time frame "t2." In this scenario, candidate 32 is likely a foreign object 35 that is positioned between cameras 14 and the web 12 and does not represent a defect such as a tear or hole in the web 12.

Figure 4A:
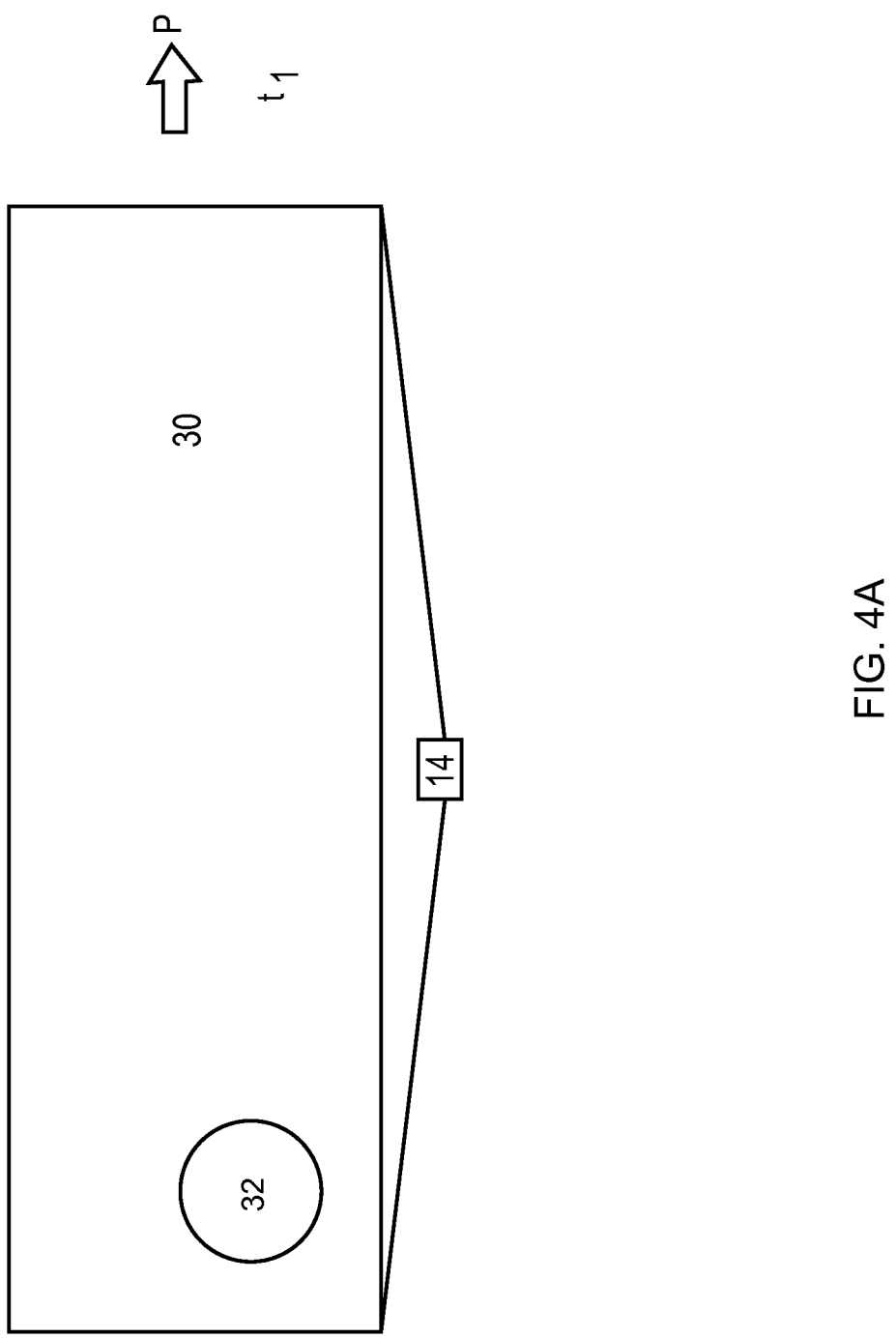
FIG. 4A illustrates one or more systems for monitoring a web traveling along a defined path "P" in a first time frame.
Figure 4B:
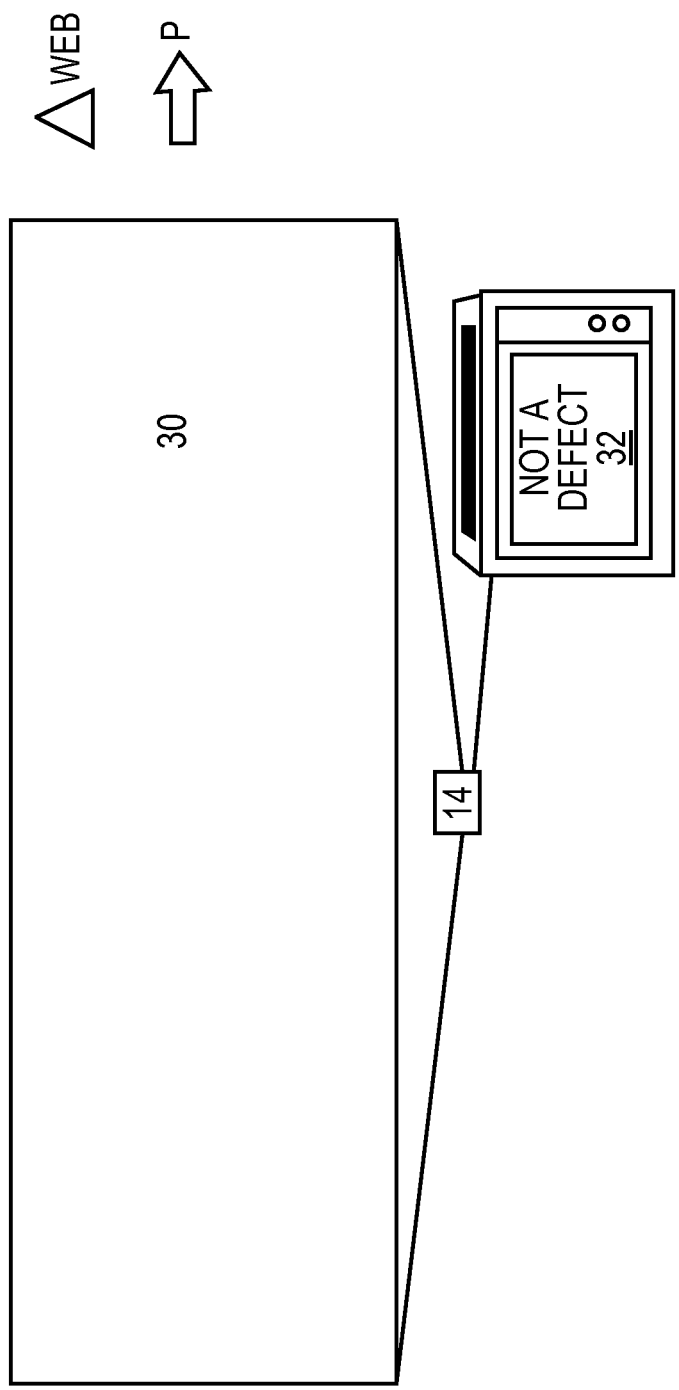
FIG. 4B illustrates one or more systems for monitoring a web traveling along a defined path "P" in a second time frame.

As illustrated in FIG. 4A and FIG. 4B, a candidate 32 is detected in the first time frame "t1" scanning sequence in FIG. 4A but is not detected in the second time frame "t2" in FIG. 4B. In this instance, the candidate 32 is not likely a defect and likely represents a situation in which an object was positioned between the camera 14 and the region of interest 30 in the first scanning sequence, but was not positioned between the camera 14 and the region of interest 30 in the second time frame "t2."

In one or more embodiments, the control system 26 may assign a vector to the candidate 32 that is defined between the position of the candidate 32 at the first time frame "t1" and the second time frame "t2." The control system 26 would then compare that vector to a vector assigned to a reference point on the web 12 between the first time frame "t1" and the second time frame "t2." The control system 26 would then verify that the vector assigned to the candidate 32 is the same or about the same in both magnitude and direction to the vector assigned to the reference point of the web 12 in order to determine that the candidate 32 is a defect 34.

Each of the embodiments illustrated throughout the Figures may be utilized with a single camera system or a multiple camera system. Multiple cameras may be synchronized to allow for a wider field of viewing. Furthermore, various conventional hardware and/or software components may be utilized in a system 10 of the disclosed invention.

Figure 5:
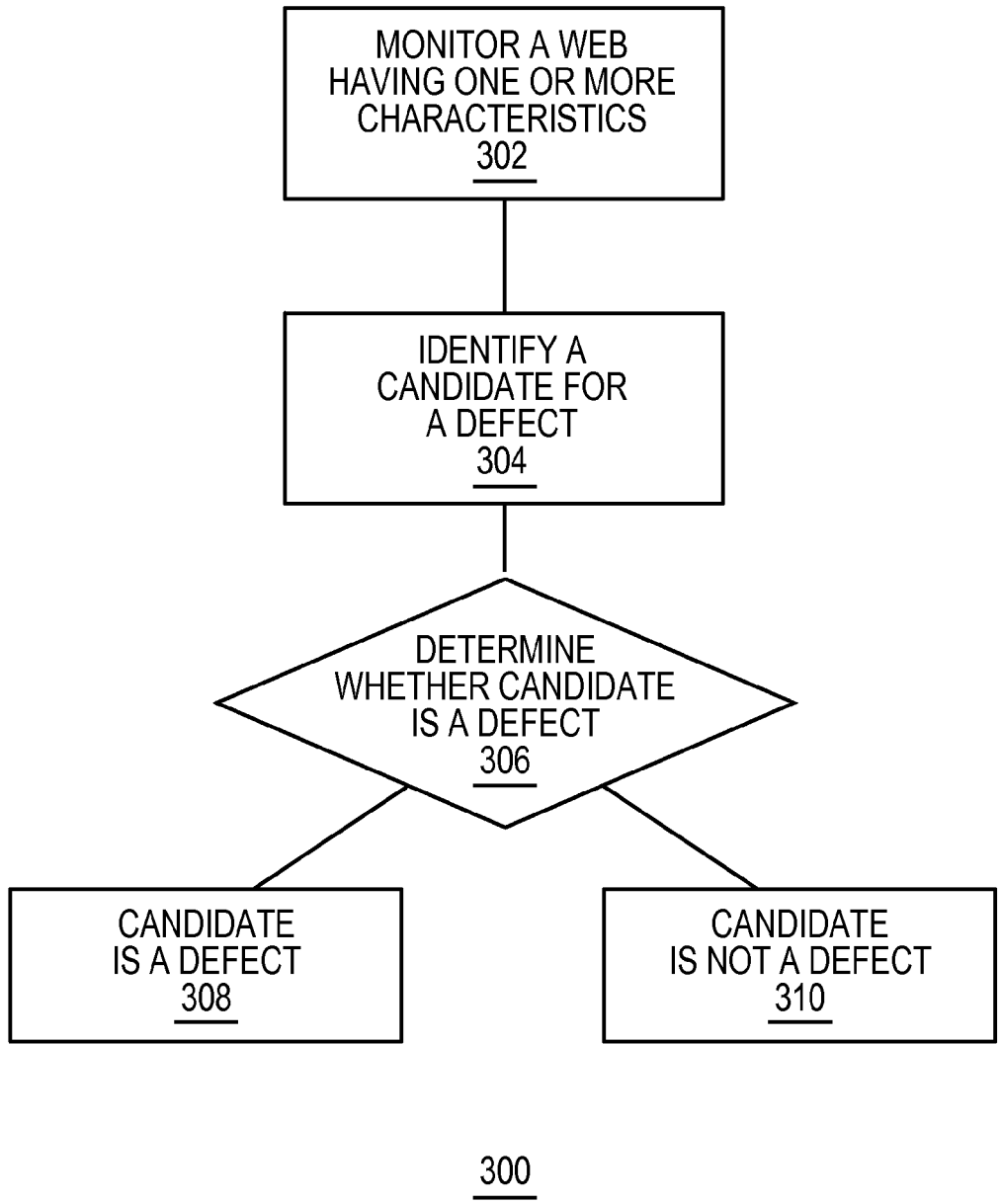
FIG. 5 is a flow chart illustrating one or more methods for monitoring a web.

FIG. 5 is a flow-chart illustrating one or more methods for monitoring a web according to one or more embodiments of the first invention. The one or more methods 300 may include monitoring a web having one or more characteristics 302. The one or more characteristics may be position, speed, direction of travel, and time of the web. In one or more embodiments, the one or more characteristics may be one of opaqueness, reflected light, and light intensity.

The one or more methods 300 may include indentifying a candidate for a defect 304. Identifying a candidate for a defect 304 may include measuring the opaqueness or amount of reflected light on the web, such as, for example, through the use of infrared or similar technology. Identifying a candidate for a defect 304 may include identifying a deviation in the one or more characteristics of the web at a first time. Identifying a candidate for a defect 304 may include using one of the camera 14 or detector 16 to scan the web 12 for deviations in measured characteristics thereof. In one or more embodiments, the camera 14 and detector 16 may be an integrally formed unit.

The one or more methods 300 may include determining whether the candidate is a defect by comparing one or more characteristics of the candidate to the one or more characteristics of the web 306. Determining whether the candidate is a defect 306 may include comparing one or more characteristics of the candidate at a second time to the one or more characteristics of the web at a first time. Determining whether the candidate is a defect 306 may include comparing one or more characteristics of a leading edge of the candidate at a second time to the one or more characteristics of the web at a first time. Making the determination at a leading edge may be important since a tear may enlarge on the trailing edge portions, while a determination at a leading edge would still lead to a correct determination of a defect.

Determining whether the candidate is a defect 306 may include monitoring the candidate at successive time frames along the production line. If the monitored characteristics of the candidate are determined to be within a selected range of values, then the system 10 may determine that the candidate is likely a defect. If the monitored characteristics of the candidate are determined to be outside of a selected range of values, then the system 10 may determine that the candidate is likely a defect.

The various techniques described herein may be implemented with hardware or software or, where appropriate, with a combination of both. These techniques may be embodied on the server 20 of the presently disclosed subject matter. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed invention. When implemented on a general-purpose processor, the program code combines with the processor to provide a unique apparatus that operates to perform the processing of the presently disclosed invention.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method for identifying defects in a web of material, comprising:
    monitoring one or more characteristics of a web translating along a travel path, the one or more characteristics including one of position, speed of travel, and direction of travel;
    identifying a candidate for a defect by detecting one or more deviations in the web at a first time frame;
    monitoring one or more characteristics of the candidate for a defect at one or more subsequent time frames, the one or more characteristics including one of position, speed of travel, and direction of travel;
    assigning a vector corresponding to the web translating along a travel path based on the one or more characteristics; and
    assigning a vector corresponding to the candidate for a defect based on the one or more characteristics;
    determining whether the candidate is a defect by comparing the one or more characteristics of the candidate at one or more subsequent time frames to the one or more characteristics of the web;
    wherein determining whether the candidate is a defect comprises comparing the vector corresponding to the candidate for a defect with the vector corresponding to the web translating along a travel path.

2. The method of claim 1, wherein monitoring one or more characteristics of the candidate for a defect at one or more subsequent time frames comprises monitoring one or more characteristics of a leading edge of the candidate for a defect and assigning a vector corresponding to the defect comprises assigning a vector based on the one or more characteristics of a leading edge of the candidate for a defect.

3. The method of claim 1, wherein monitoring one or more characteristics of the candidate for a defect at one or more subsequent time frames comprises monitoring one or more characteristics of a portion of the candidate for a defect and assigning a vector corresponding to the defect comprises assigning a vector based on the one or more characteristics of a portion of the candidate for a defect.

4. The method of claim 1, wherein the one or more characteristics of the web is one of opaqueness, and identifying a defect comprises identifying a deviation in opaqueness of a portion of the web.

5. A system for identifying defects in a web of material, comprising:
    at least one camera for monitoring a web having one or more characteristics, the one or more characteristics including one of position, speed of travel, and direction of travel;
    at least one detector configured for identifying a candidate for a defect at a first time frame, wherein the at least one camera monitors the one or more characteristics of the candidate for a defect at one or more subsequent time frames; and
    a control module for determining whether the candidate is a defect by comparing one or more characteristics of the candidate to the one or more characteristics of the web, the control module configured to:
        assign a vector corresponding to the web translating along a travel path based on the one or more characteristics;
        assign a vector corresponding to the candidate for a defect based on the one or more characteristics; and
        determine whether the candidate is a defect by comparing the vector corresponding to the candidate for a defect with the vector corresponding to the web translating along a travel path.

6. The system of claim 5, wherein the one or more characteristics of the web is one of opaqueness, and
    the at least one detector is configured for identifying a candidate for a defect by identifying a deviation in opaqueness of a portion of the web.

7. The system of claim 5, wherein the at least one detector is configured for identifying a candidate for a defect by identifying a deviation in the one or more characteristics of the web at a first time.

8. The system of claim 5, wherein the control module is configured for determining whether the candidate is a defect by comparing one or more characteristics of a leading edge of the candidate at a second time to the one or more characteristics of the web at a first time.

9. The system of claim 5, further including a display for displaying images received from the at least one camera.

10. A method for identifying defects in a web of material, comprising:
    monitoring one or more characteristics of a web translating along a travel path, the one or more characteristics including one of position, speed of travel, and direction of travel;
    identifying a candidate for a defect by detecting one or more deviations in the web at a first time frame;
    monitoring one or more characteristics of the candidate for a defect, the one or more characteristics including one of position, speed of travel, and direction of travel;
    assigning a vector corresponding to the web translating along a travel path based on the one or more characteristics;
    assigning a vector corresponding to the candidate for a defect based on the one or more characteristics;
    determining whether the candidate is a defect by comparing the vector corresponding to the candidate for a defect with the vector corresponding to the web translating along a travel path.

11. The method of claim 10, wherein monitoring one or more characteristics of the candidate for a defect comprises monitoring one or more characteristics of a leading edge of the candidate for a defect and assigning a vector corresponding to the defect comprises assigning a vector based on the one or more characteristics of the leading edge of the candidate for a defect.

12. The method of claim 10, wherein monitoring one or more characteristics of the candidate for a defect at one or more subsequent time frames comprises monitoring one or more characteristics of a portion of the candidate for a defect and assigning a vector corresponding to the defect comprises assigning a vector based on the one or more characteristics of a portion of the candidate for a defect.

13. A system for identifying defects in a web of material, comprising:
    at least one camera for monitoring a web having one or more characteristics;
    at least one detector configured for identifying a candidate for a defect; and
    a control module for determining whether the candidate is a defect by comparing one or more characteristics of the candidate to the one or more characteristics of the web, wherein comparing one or more characteristics of the candidate for a defect at one or more subsequent time frames comprises monitoring one or more characteristics of a portion of the candidate for a defect and assigning a vector corresponding to the defect comprises assigning a vector based on the one or more characteristics of a portion of the candidate for a defect.

\* \* \* \* \*